(12) United States Patent
Adachi et al.

(10) Patent No.: US 9,896,005 B2
(45) Date of Patent: Feb. 20, 2018

(54) VEHICLE SEAT

(71) Applicant: TS TECH CO., LTD., Asaka-shi, Saitama (JP)

(72) Inventors: Takamasa Adachi, Tochigi (JP); Tsutomu Matsuzaki, Tochigi (JP); Masayuki Yamaguchi, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 15/095,534

(22) Filed: Apr. 11, 2016

(65) Prior Publication Data
US 2016/0221482 A1 Aug. 4, 2016

Related U.S. Application Data

(63) Continuation of application No. 14/717,713, filed on May 20, 2015, now Pat. No. 9,346,379, which is a
(Continued)

(30) Foreign Application Priority Data

Dec. 24, 2010 (JP) .................................. 2010-287907
Dec. 24, 2010 (JP) .................................. 2010-287910
(Continued)

(51) Int. Cl.
*B60N 2/42* (2006.01)
*B60N 2/427* (2006.01)
(Continued)

(52) U.S. Cl.
CPC ....... *B60N 2/4228* (2013.01); *B60N 2/42709* (2013.01); *B60N 2/42745* (2013.01);
(Continued)

(58) Field of Classification Search
CPC .... B60N 2/4228; B60N 2/70; B60N 2/42709; B60N 2/42745; B60N 2/68; B60N 2/7094
(Continued)

(56) References Cited

U.S. PATENT DOCUMENTS 3,727,980 A 4/1973 Tischler
6,003,939 A 12/1999 Nakai et al.
(Continued)

FOREIGN PATENT DOCUMENTS

JP 10-76084 3/1998
JP H1134707 A 2/1999
(Continued)

OTHER PUBLICATIONS

Extended European Search Report for European Application No. 11851080.9, dated Aug. 9, 2016, 5 pages.
(Continued)

*Primary Examiner* — Anthony D Barfield
(74) *Attorney, Agent, or Firm* — Hamre, Schumann, Mueller & Larson, P.C.

(57) ABSTRACT

A seat back pad 70 has a groove 73 for tucking a skin material therein, formed at borders between a central portion 71 and side portions 72. A hole (slot hole 74) is formed in a bottom of the groove 73 along the groove 73. A tuck-in wire 76 for tucking the skin material in includes a plurality of tuck-in portions 76A provided along the groove 73, and a connecting portion (detour portion 76B) detouring around the hole and connecting the tuck-in portions 76A. With this configuration, when an upper body of an occupant P subsides into a seat back S2 in a rear-end collision of a vehicle, the central portion 71, defined by the groove 73 as a border, is easily and sufficiently moved rearward relative to the left and right side portions 72. Furthermore, the tuck-in wire 76 is not exposed through the hole, and thus adhesion between
(Continued)

the seat back pad 70 and the tuck-in wire 76 can be improved.

17 Claims, 11 Drawing Sheets

Related U.S. Application Data continuation of application No. 14/591,599, filed on Jan. 7, 2015, now Pat. No. 9,061,613, which is a continuation of application No. 13/995,774, filed as application No. PCT/JP2011/079914 on Dec. 22, 2011, now Pat. No. 8,955,907.

(30)  Foreign Application Priority Data

| Dec. 24, 2010 | (JP) | ................................. 2010-287916 |
| Dec. 24, 2010 | (JP) | ................................. 2010-287918 |
| Dec. 24, 2010 | (JP) | ................................. 2010-287933 |

(51) Int. Cl.
   *B60N 2/64*   (2006.01)
   *B60N 2/70*   (2006.01)
   *B60N 2/68*   (2006.01)

(52) U.S. Cl.
   CPC .............. *B60N 2/64* (2013.01); *B60N 2/643* (2013.01); *B60N 2/68* (2013.01); *B60N 2/70* (2013.01); *B60N 2/7094* (2013.01)

(58) Field of Classification Search
   USPC ............................ 297/216.13, 216.14, 218.2
   See application file for complete search history.

(56) References Cited

U.S. PATENT DOCUMENTS

| 6,250,714 | B1 | 6/2001 | Nakano et al. |
| 6,578,923 | B2 | 6/2003 | Takezawa |
| 8,162,394 | B2 | 4/2012 | Yasuda et al. |
| 8,632,126 | B2 | 1/2014 | Nitsuma |
| 8,678,494 | B2 | 3/2014 | Nitsuma |
| 8,708,409 | B2 | 4/2014 | Nitsuma |
| 8,919,878 | B2 | 12/2014 | Sakamoo |
| 8,974,004 | B2 | 3/2015 | Sakamoto |
| 2007/0273129 | A1 | 11/2007 | Inoue |
| 2011/0272978 | A1 | 11/2011 | Nitsuma |
| 2011/0278886 | A1 | 11/2011 | Nitsuma |
| 2012/0038199 | A1 | 2/2012 | Matsumoto et al. |

FOREIGN PATENT DOCUMENTS

| JP | 2001341607 A | 12/2001 |
| JP | 2007-176350 | 7/2007 |
| JP | 2007-314075 | 12/2007 |
| JP | 2009-126283 | 6/2009 |
| JP | 2010-173433 | 8/2010 |
| JP | 2010-179748 | 8/2010 |
| JP | 2010214973 | 9/2010 |
| JP | 2010-234971 | 10/2010 |
| JP | 2010-254126 | 11/2010 |
| WO | WO 2009/066730 | 5/2009 |
| WO | WO 2010/084911 | 7/2010 |

OTHER PUBLICATIONS

Office Action issued for Japanese Patent Application No. 2016-157466, dated Jul. 4, 2017, 7 pages including English translation.

VEHICLE SEAT

This application is a Continuation of U.S. Ser. No. 14/717,713, filed May 20, 2015, which is a Continuation of U.S. Ser. No. 14/591,599, filed Jan. 7, 2015, which is a Continuation of U.S. Ser. No. 13/995,774, filed Jun. 19, 2013, which is a National Stage Application of PCT/JP2011/079914, filed Dec. 22, 2011, which applications are incorporated herein by reference.

TECHNICAL FIELD

The present invention relates to a vehicle seat such as a car seat, and particularly to a vehicle seat configured to absorb a shock given to a neck of an occupant in a rear-end collision.

BACKGROUND ART

In a rear-end collision of a car that occurs when a rear end of your car is struck by another car or when a rear end of your car which is being reversed strikes another car or a construct, a head of an occupant seated on a seat cushion of a car seat would largely tilt back by inertia, and in reaction thereto, the neck of the occupant would likely be given a large shock. With this in view, the car seat is commonly provided with a headrest for receiving the head of the occupant from a back side so as to absorb a shock given to the neck of the occupant in a rear-end collision of the car.

Herein, an occupant seated on a seat cushion and driving a car is, in many cases, postured in an in-seat position with a head slightly apart from the headrest to the front, and many of other passengers not driving the car also have similar in-seat positions. When a car in which an occupant/passenger is seated in such a posture is rear-ended, the head of the occupant would tilt slightly to the rear before being received, and would go tilted back to the front in reaction thereto, so that its benefit of absorbing a shock given to the neck of the occupant would be reduced.

Against this backdrop, there are proposed a vehicle seat and a seat back device which are configured such that in a rear-end collision of the car, an upper body of an occupant tending to move rearward by inertia is caused to subside into a seat back disposed at his/her rear side so that the head of the occupant is swiftly received by the headrest (e.g., see Patent Literatures 1, 2).

A vehicle seat described in Patent Literature 1 includes a pressure-receiving member connected rearward-movably to a seat back frame, as a member for receiving an upper body of an occupant by means of a seat back pad (seat back cushion) within a seat back. A seat back device described in Patent Literature 2 includes a sheet-like elastic member corresponding to the pressure-receiving member described in Patent Literature 1.

In the vehicle seat described in Patent Literature 1 and the seat back device described in Patent Literature 2, the pressure-receiving member (sheet-like elastic member) moves together with the seat back pad to the rear relative to the seat back frame when the rear-end collision of a vehicle causes a rearward motion load to be imposed on an occupant and thus presses an upper body of the occupant against the seat back. As a result, the upper body of the occupant subsides into the seat back, allowing the head of the occupant to be swiftly received by the headrest; in this way, the shock be given to the neck of the occupant can be absorbed.

On the other hand, a vehicle seat having a seat structure in which a side air bag device is provided is generally known (e.g., see Patent Literature 3). The structure disclosed in this Patent Literature 3 is such that an insert wire (tuck-in wire) for attaching a seat skin inside a vertical groove formed in the seat back pad is embedded in a seat back pad.

CITATION LIST

Patent Literature

Patent Literature 1: JP 2010-179748 A
Patent Literature 2: JP 2010-254126 A
Patent Literature 3: JP 10-76084 A

SUMMARY OF INVENTION

Technical Problem

The vehicle seat described in Patent Literature 1 and the seat back device described in Patent Literature 2 do not have any special structure adopted such that the upper body of an occupant is allowed to subside into the seat back sufficiently in a rear-end collision of a car.

The structure in which an insert wire is embedded in a seat back pad has a problem that if there are many portions in the seat back pad from which the insert wire is exposed to outside, the seat back pad would be susceptible to damage at the edges of the seat back pad adjoining the wire.

The present invention is made in view of the technical background as described above, and a challenge to be taken up is to provide a vehicle seat which allows an upper body of an occupant to subside into a seat back sufficiently in a rear-end collision of a vehicle to effectively suppress tilting-back of a head of the occupant so that a shock to be given to his/her neck can be sufficiently absorbed, and in which adhesion between a tuck-in wire and a seat back pad is improved.

Solution to Problem

A vehicle seat configured to solve the aforementioned challenge according to the present invention comprises a seat cushion, a seat back covered with a skin material and incorporating left and right side frames, a headrest, a pressure-receiving member connected rearward-movably to the left and right side frames, a seat back pad with which at least a front surface of the pressure-receiving member and a seat back frame are covered, and tuck-in wires embedded in the seat back pad. This vehicle seat is configured such that a rearward motion load received from an upper body of an occupant seated on the seat cushion and acting on the seat back causes the pressure-receiving member to move rearward to cause the upper body of the occupant to subside into the seat back. The seat back pad includes a central portion configured to face a back of the upper body of the occupant and side portions configured to face sides of the upper body of the occupant, the side portions being provided continuously to the central portion, the seat back pad having a groove for tucking the skin material therein, the groove being formed at borders between the central portion and the side portions. In a bottom of the groove, a hole is formed along the groove. Each tuck-in wire includes a plurality of tuck-in portions provided along the groove, and a connecting portion detouring around the hole and connecting the plurality of the tuck-in portions.

In this vehicle seat, the rearward motion load received from the upper body of the occupant and acting on the seat back in a rear-end collision of the vehicle causes the pressure-receiving member to move rearward together with the seat back pad relative to the seat back frame, so that the upper body of the occupant subsides into the seat back. In this motion, the central portion of the seat back pad which faces the back of the upper body of the occupant and which is bordered with the groove having a hole is caused to move rearward easily and sufficiently relative to the side portions. Thus, the upper body of the occupant is allowed to subside sufficiently into the seat back. As a result, tilting-back of a head of the occupant is suppressed sufficiently so that a shock which would be given to his/her neck can be sufficiently absorbed. Moreover, since the tuck-in wire is configured to partially lie along the groove so as to detour around the hole, the tuck-in wire is not exposed through the hole, so that adhesion between the seat back pad and the tuck-in wire can be improved. Accordingly, damage of the seat back pad at the edges of the seat back pad adjoining the wire is suppressed.

In the vehicle seat as described above, the tuck-in wire may preferably be embedded in a position shifted from the groove to a central portion side of the seat back pad around the hole. In this configuration, the tuck-in wire may have a two-dimensionally bent simple shape, and thus the productivity for the tuck-in wires can be improved.

In the vehicle seat as described above, the hole may preferably be disposed in a position outside relative to the pressure-receiving member and inside relative to the left or right side frame with respect to a lateral direction.

With this configuration, since the hole is disposed in a position outside relative to the pressure-receiving member and inside relative to the left or right side frame with respect to the lateral direction, a region in which the pressure-receiving member and the side frames are shifted relative to each other in the front-rear direction and a region in which the seat back pad deforms substantially coincide with each other. This makes the seat back pad easily deformable and the pressure-receiving member smoothly movable rearward.

The vehicle seat as described above may preferable comprise a connecting wire which includes two end portions connected to the left and right side frames and a middle portion supporting the pressure-receiving member, wherein the connecting wire includes extra-length portions bowed to deviate from an axial line connecting the two end portions of the connecting wire, the extra-length portions being formed in left and right sections of the connecting wire between the side frames and the pressure-receiving member.

With this configuration, when the upper body of the occupant is caused to subside into the seat back, the connecting wire by which the pressure-receiving member is rearward-movably connected to the side frames sags rearward and extends while the left and right extra-length portions acts as torsion springs. Accordingly, the rearward-motion stroke of the pressure-receiving member increases and thus the upper body of the occupant subsides deeply into the seat back. As a result, the tilting-back of the head of the occupant is suppressed sufficiently so that a shock to be given to his/her neck can be absorbed sufficiently.

In the vehicle seat with the connecting wire as described above, the hole may preferably be disposed in positions facing to the extra-length portions of the connecting wire. In this configuration, a region in which the connecting wire deforms and a region in which the seat back pad deforms coincide with each other, and thus the seat back pad and the extra-length portions are made easily deformable, so that the pressure-receiving member can be caused to smoothly move rearward.

The connecting wire may preferably be configured such that two end portions connected by the side frames are disposed in positions higher than the middle portion supporting the pressure-receiving member. In this configuration, the pressure-receiving member is suspended via the connecting wire on the side frames, and thus the pressure-receiving member achieves a stabilized posture when it is being mounted to the seat back frame and after it has been mounted.

Assuming that the extra-length portions of the connecting wire are bowed upwardly, when the upper body of the occupant is caused to subside into the seat back in a rear-end collision of the vehicle, the extra-length portions properly block shoulder regions of the occupant from subsiding, so that the occupant achieves a stabilized seat-in posture in the rear-end collision.

Assuming that webbing mounting hardware for a side air bag device is welded to at least one of the left and right side frames, it is preferable that at least one end portion of the connecting wire is connected to a position adjacent to a welded spot of the webbing mounting hardware. With this configuration, the rearward motion load imposed on the pressure-receiving member is received effectively by a higher-rigidity portion(s) of the side frame(s).

The extra-length portions of the connecting wire may preferably be bowed toward directions away from the webbing mounting hardware welded to the side frame(s). With this configuration, the extra-length portions do not interfere with the webbing mounting hardware, and thus the workability in attachment of the connecting wire is improved.

The vehicle seat as described above may comprise an upper connecting member configured to connect an upper portion of the pressure-receiving member to the left and right side frames, which upper connecting member comprises a wire having a springiness. This vehicle seat may preferably be configured to comprise a cross member disposed above the pressure-receiving member and bridging the left and right side frames, wherein the cross member comprises a rod having a rigidity higher than that of the upper connecting member, with a plurality of bent portions formed therein, the bent portions being bowed downwardly relative to two end portions fixed to the side frames.

With this configuration, the rearward motion of the shoulder regions of the occupant is received and blocked by the plurality of bent portions of the cross member when the upper body of the occupant is caused to subside into the seat back, so that the upper body of the occupant subsides into the seat back in a safe in-seat posture with his/her back being hunched. As a result, the clearance between the head of the occupant and the headrest swiftly decreases, and thus the tilting-back of the head is suppressed effectively, so that the shock given to the neck is absorbed satisfactorily.

Since the bent portions are bowed downwardly relative to the two end portions fixed to the side frames, the two end portions fixed to the side frames serve as pivots about which the bent portions deform so as to turn rearward in an intense rear-end collision; therefore, the bent portions can absorb the shock without imposing a great force on the occupant.

The plurality of bent portions of the cross member may preferably be disposed rearwardly relative to an initial position of the pressure-receiving member before moving rearward. With this configuration, after the shoulder regions of the occupant subside slightly into the seat back, the upper body of the occupant becomes postured with his/her back being hunched, and the head of the occupant is swiftly brought close to the headrest and received by the headrest.

Herein, the bent portions of the cross member may preferably be configured to comprise four bilaterally symmetrical bent portions of which an inner pair of left and right bent portions is disposed with lower ends thereof located above the pressure-receiving member and an outer pair of left and right bent portions is disposed with lower ends thereof located laterally outside the pressure-receiving member above the pressure-receiving member. With this configuration, the rearward motion load given from the shoulder regions of the occupant to the seat back is received by the four bent portions in a well-balanced fashion, so that the occupant achieves a stabilized in-seat posture.

The side frames may preferably be configured to include pad shape retainer portions each shaped like a plate jutting frontward to retain shapes of the side portions of the seat back pad, and pipe portions protruding upward beyond the pad shape retainer portions, wherein a plate-like bracket is fixed to the pipe portions and protrudes frontward.

With this configuration, since the pad shape retainer portions and the bracket disposed above in the side frames serve to suppress rearward deformation of the seat back pad at upper and lower portions of the seat back pad when the upper body of the occupant is caused to subside into the seat back, the occupant is likely to become postured with his/her back being hunched, and thus the central region of his/her back subsides into the seat back pad antecedently; therefore, the clearance between the head and the headrest swiftly decreases, so that the shock given to the neck can be absorbed.

The bracket may preferably comprise a plate member shaped like a letter U in cross section with flanges at an upper end and a lower end thereof. With this configuration, the rigidity of the bracket can be increased, and the in-seat posture of the occupant in a rear-end collision be made easily controllable.

The bracket may preferably be configured as a mount bracket to which an attachment is attached, such that the bracket is fixed to a laterally inner side portion of an outer peripheral surface of the pipe portion. With this configuration, the portion at which the bracket is fixed to the pipe portion, for example, the welded spot, is located at a laterally inner side of the pipe portion, and thus this fixed portion is not exposed to the outside of the side frame; therefore, the attachment can be attached thereto from outside with ease.

The bracket may preferably be configured as a mount bracket to which an attachment is attached, and the attachment is arranged to extend along the pipe portion, wherein the bracket has a slot for attaching an attachment thereto, and a direction of a length of the slot is parallel to a direction of a length of the pipe portion. With this configuration, the attachment is disposed along the pipe portion of the side frame, and the slot for allowing a positioning error which would be introduced when the attachment is attached extends in parallel to the pipe portion; therefore, the attachment is prevented from becoming misaligned in the front-rear direction even when a positioning error is introduced for the attachment. Accordingly, the attachment can be arranged with the side frame in such a manner as to achieve compactness, and the workability in attachment is improved due to allowance of the positioning error to be introduced for the attachment.

The tuck-in wires and the pressure-receiving member may preferably have portions overlapping each other as viewed from a front-rear direction.

With this configuration, when a load is imposed on the tuck-in wires from frontward, the pressure-receiving member receives this load; therefore, unevenly balanced imposition of the load on the tuck-in wires can be suppressed.

It may be preferably that webbing mounting hardware for a side air bag device is welded to at least one of the left and right side frames, and the webbing mounting hardware is located rearwardly of the side portion.

With this configuration, the webbing mounting hardware serves to suppress excessive deformation of the side portion toward rearward.

DESCRIPTION OF EMBODIMENTS

Figure 1:
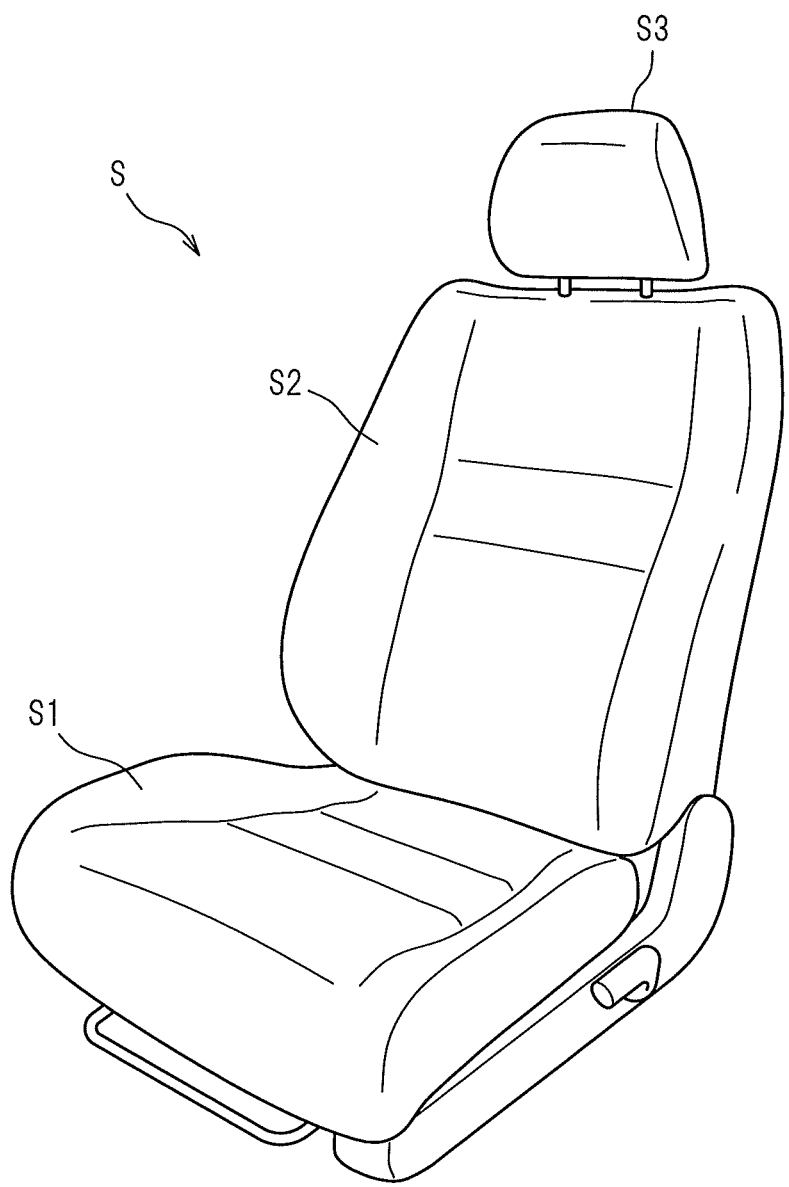
FIG. 1 is a perspective view of a car seat showing one embodiment of a vehicle seat according to the present invention.

Hereafter, a description will be given of one embodiment of a vehicle seat according to the present invention with reference made to the accompanying drawings. The vehicle seat according to one embodiment is configured as a car seat S arranged in a location of a driver's seat of an automobile, for example as shown in FIG. 1. This car seat S includes a seat cushion S1, a seat back S2 and a headrest, in which a pad material made of a cushion material such as urethane foam is covered with a skin material such as a synthetic leather or a cloth.

Figure 2:
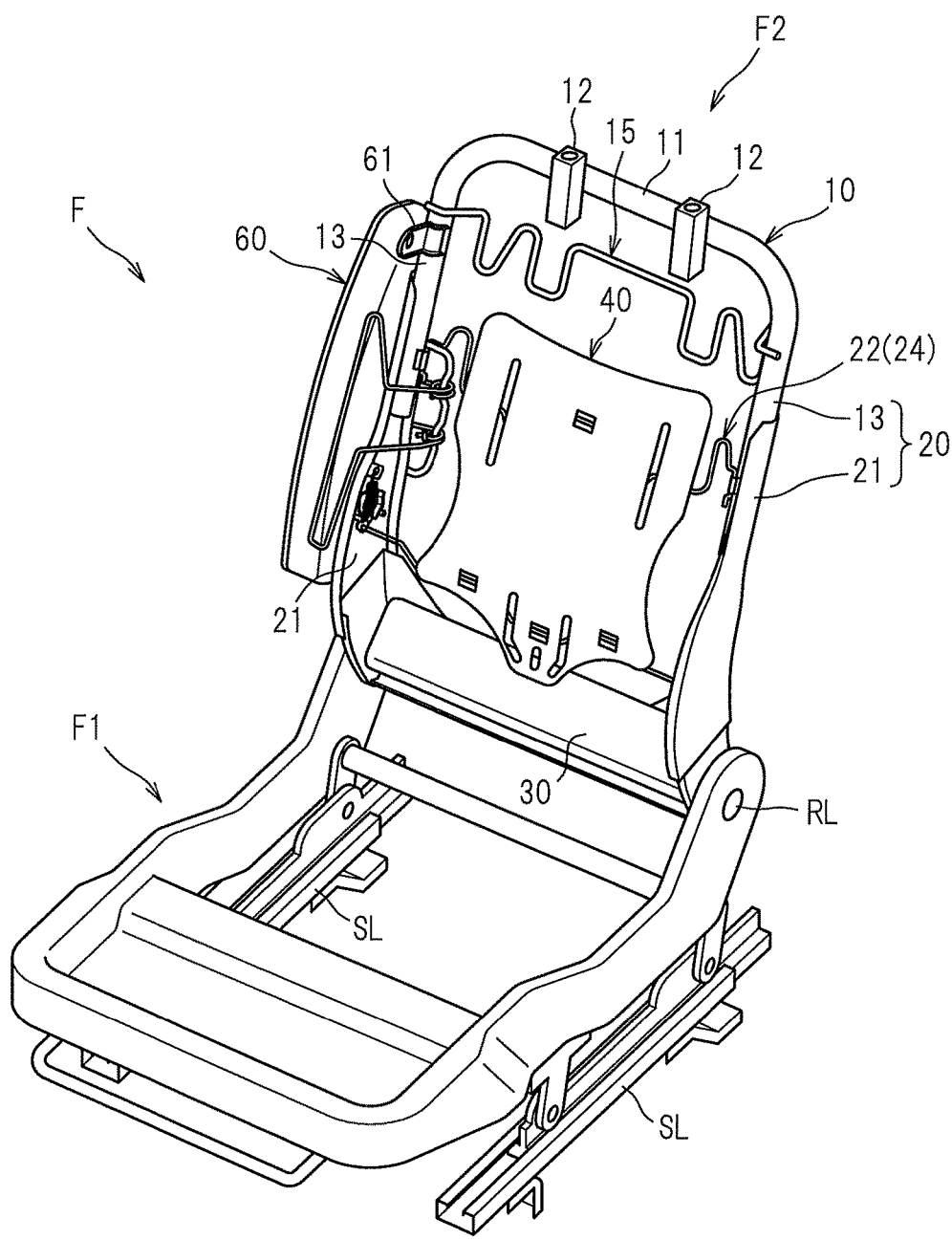
FIG. 2 is a perspective view of a seat frame incorporated in the car seat shown in FIG. 1.
Figure 3:
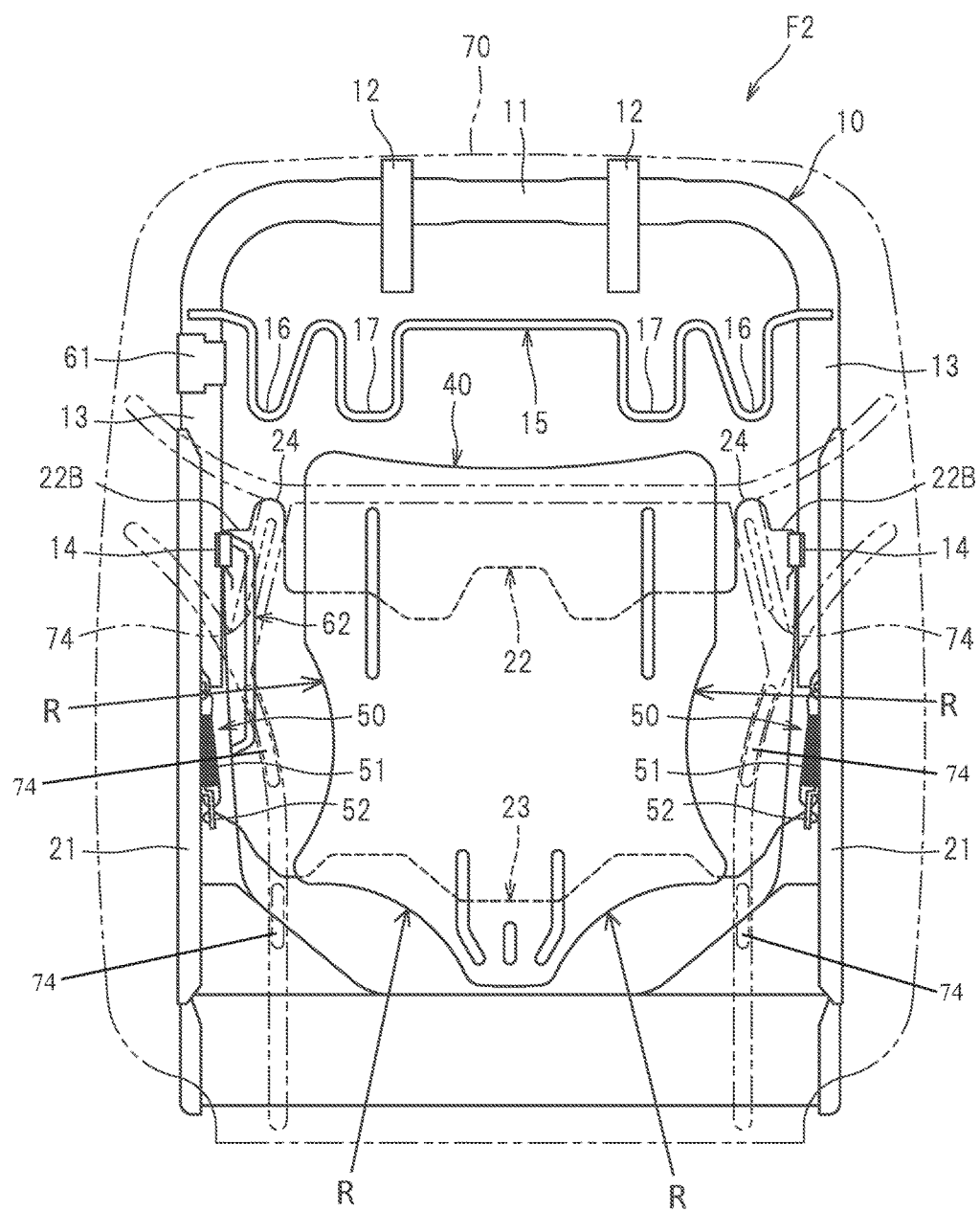
FIG. 3 is a front elevation of a seat back frame shown in FIG. 2.

The seat cushion S1 and the seat back S2 incorporate a seat frame F as shown in FIGS. 2 and 3. This seat frame F comprises a seat cushion frame F1 which constitutes a frame of the seat cushion S1 and a seat back frame F2 which constitutes a frame of the seat back S2. The headrest S3 incorporates a headrest frame (not shown) which constitutes its frame.

The seat cushion frame F1 shown in FIG. 2 is installed, for example, on a floor for a driver's seat via slide rails SL, in such a manner that its position in the front-rear direction is adjustable, where the directions are designated as front-rear, left-right (lateral) and upward-downward (upper-lower) directions in view of the eyes of an occupant assumed to be seated on the seat cushion S1 shown in FIG. 1. A lower portion of the seat back frame F2 is pivotally linked to a rear portion of the seat cushion frame F1 via a reclining mechanism RL whereby the seat back frame F2 is rendered tiltable frontward and rearward.

The seat back frame F2 is configured in the shape of a frame with an upper frame 10, left and right side frames 20 and a lower frame 30 integrally joined together by welding or the like. Inside this frame-shaped seat back frame F2, a pressure-receiving member 40 for supporting an upper body of an occupant in a manner that renders the upper body movable rearward is disposed.

The upper frame 10, made by bending tubing, includes a transverse pipe portion 11 and vertical pipe portions 13, 13 extending from the left and right ends of the transverse pipe portion 11, and is formed like an inverted U. A pair of left and right support brackets 12, 12 for attaching a pair of left and right headrest stays (designation by reference characters is omitted) protruding from a lower portion of the headrest S3 are fixed to a front side of the transverse pipe portion 11 by welding.

The vertical pipe portions 13, 13 are integrated with left and right side frame main body portions 21, 21 which are continuously welded to lower portions of the vertical pipe portions 13, 13, so as to constitute the left and right side frames 20. The side frame main body portions 21, 21 are made of sheet metal, and upper portions thereof are configured to wrap the vertical pipe portions 13, 13 of the upper frame 10, and are integrally spot-welded to the vertical pipe portions 13, 13. The side frame main body portions 21, 21 are configured to jut frontward to retain the shapes of side portions of a seat back pad which will be described later, to constitute pad shape retainer portions (see positions designated by the reference numeral 21).

The pressure-receiving member 40 is made of a sheet-like plastic plate, and an upper portion thereof is connected to the left and right side frames 20 via an upper connecting wire 22 configured as an upper connecting member, while a lower portion thereof is connected to the left and right side frames 20 via a lower connecting wire 23 (see FIG. 3) configured as a lower connecting member. FIG. 3 shows the pressure-receiving member 40 having a recessed portion R formed on a peripheral edge of the pressure-receiving member 40. The recessed portion R is recessed laterally inwardly relative to other portions of the peripheral edge of the pressure-receiving member 40.

Figure 4:
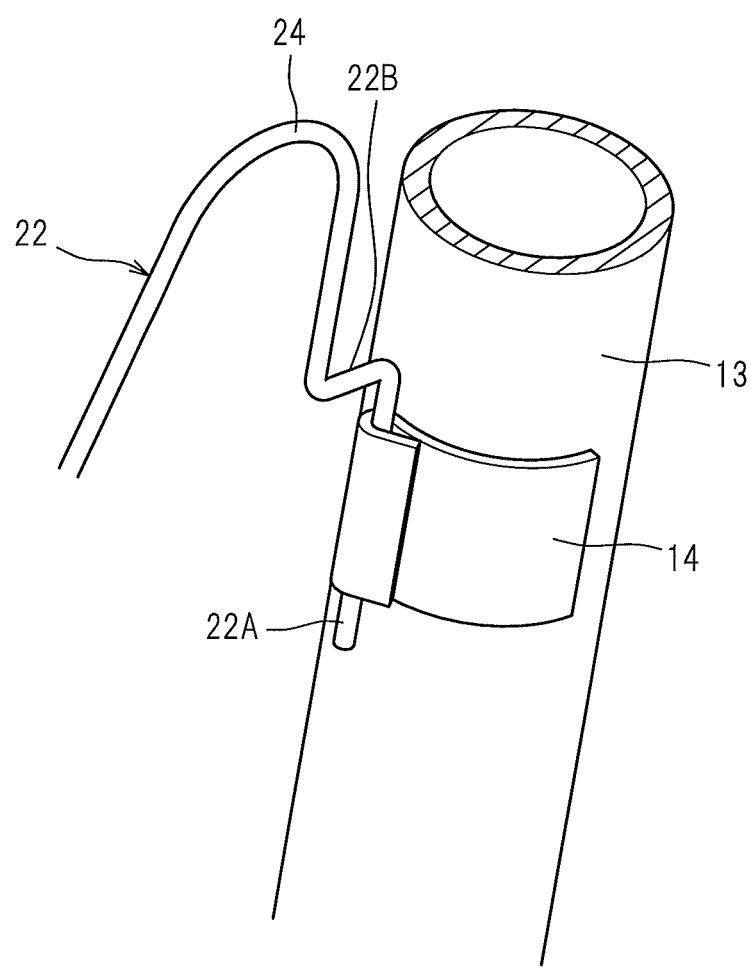
FIG. 4 is a perspective view of a support tab shown in FIG. 3 and its vicinity.

As shown in FIG. 4, a left end portion 22A of the upper connecting wire 22 is bent downward along the vertical pipe portion 13 of the upper frame 10, and the left end portion 22A of the upper connecting wire 22 is wrapped with a support tab 14 fixed by welding to the left vertical pipe portion 13 of the upper frame 10, and connected to the vertical pipe portion 13.

Although not illustrated, a right end portion 22A of the upper connecting wire 22 is also wrapped with a similar support tab 14 and connected to the right vertical pipe portion 13 of the upper frame 10. An engageable portion (not shown) formed on a rear side of an upper portion of the pressure-receiving member 40 is engaged with a middle portion of the upper connecting wire 22, and thus the upper portion of the pressure-receiving member 40 is connected via the upper connecting wire 22 to the left and right side frames 20.

On the other hand, two end portions of the lower connecting wire 23 are, as shown in FIG. 3, engaged with toggle stopper mechanisms 50, 50 disposed on inner sides of the left and right side frame main body portions 21, 21. An engageable portion (not shown) formed on a rear side of a lower portion of the pressure-receiving member 40 is engaged with a middle portion of the lower connecting wire 23, and thus the lower portion of the pressure-receiving member 40 is connected via the lower connecting wire 23 to the left and right side frames 20.

It is appreciated that if the pressure-receiving member 40 is suspended from the side frames 20 by means of the upper connecting wire 22 and the lower connecting wire 23, the posture of the pressure-receiving member 40 is kept stabilized during and after the pressure-receiving member 40 is attached to the seat back frame F2. In this respect, in order to stabilize the posture of the pressure-receiving member 40, the upper connecting wire 22 and the lower connecting wire 23 are arranged such that the two end portions 22B (the positions of the upper portions of the end portions 22A led out from upper ends of the support tabs 14) at which the wires are connected to the side frames 20 are located in positions higher than the middle portions thereof supporting the pressure-receiving member 40.

Figure 6:
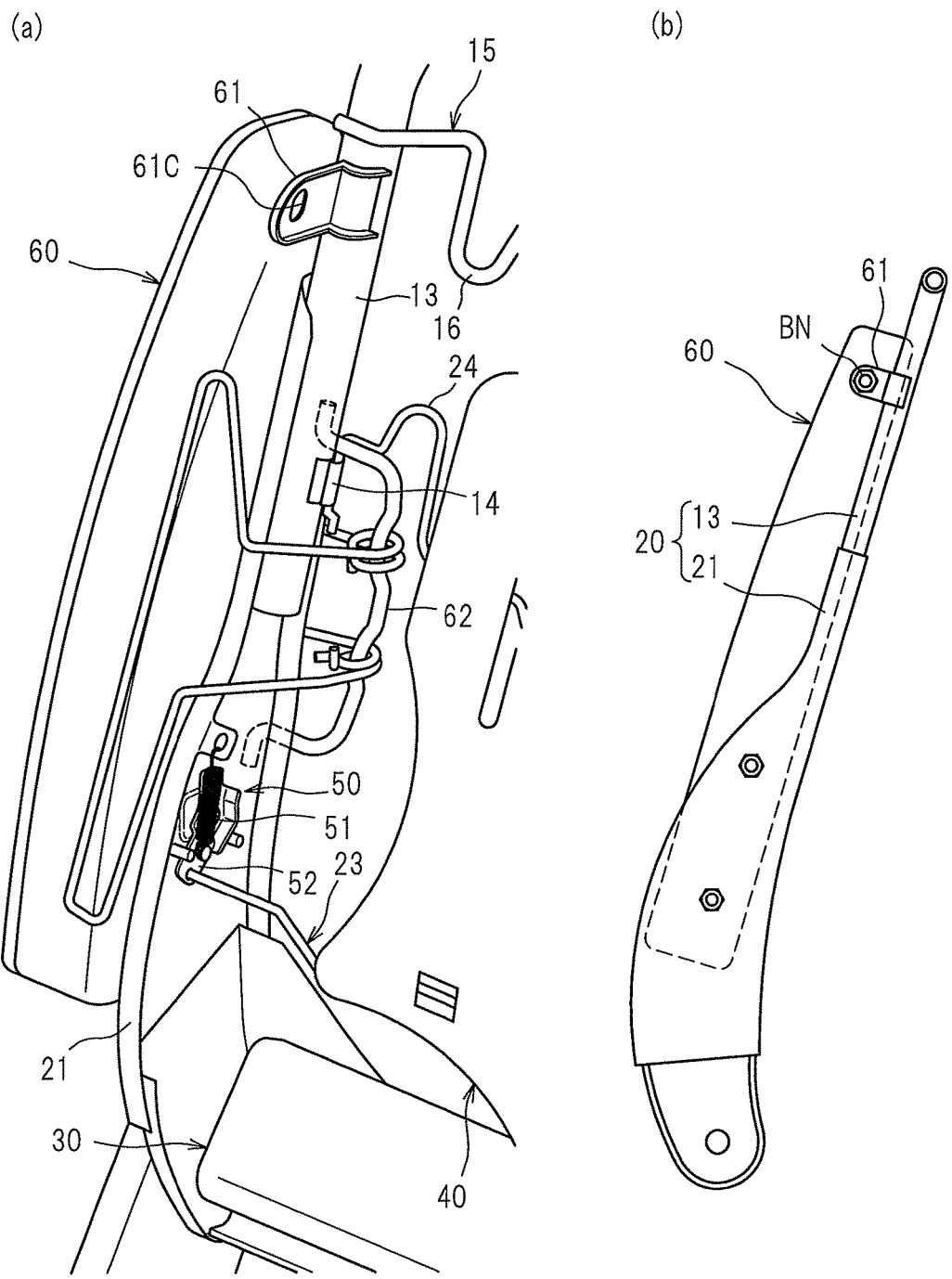
FIG. 6 show partially enlarged views of a side air bag device shown in FIG. 2 and its vicinity, in which (a) is a perspective view, and (b) is a side elevation.

As shown in FIG. 3 and FIG. 6, the toggle stopper mechanisms 50, 50 include pivotal link members 52, 52 that are pivotable rearward over dead points while resisting the tensions of extension springs 51, 51, and the two ends of the lower connecting wires 23 are connected to lower ends of these pivotal link members 52, 52.

In order to allow the pressure-receiving member 40 to swiftly and smoothly move rearward when a rearward motion load of a predetermined magnitude or greater from the upper body of an occupant seated on the seat cushion S1 (see FIG. 1) acts on the seat back S2, the upper connecting wire 22 and the lower connecting wire 23 are made of a wire such as of spring steel having a springiness.

The tensions of the extension springs 51, 51 of the toggle stopper mechanisms 50, 50 are set at appropriate tensions such that a rearward motion load of a predetermined magnitude or greater acting on the two end portions of the lower connecting wire 23 will be able to cause the pivotal link members 52, 52 to pivot over the dead points without fail.

Moreover, in order to increase the rearward motion stroke of the pressure-receiving member 40, the extra-length portions 24, 24 bowed to deviate from an axial line connecting the two end portions 22B of the upper connecting wire 22 are formed in left and right sections of the upper connecting wire 22 which are located between the side frames 20 and the pressure-receiving member 40 in the lateral direction. These extra-length portions 24, 24 are bowed upward and bent like an inverted U so as to face the back sides of the shoulder regions of the occupant.

Herein, as shown in FIG. 3, a cross member 15 made of a rod that is thicker and more rigid than the upper connecting wire 22 is provided to bridge the left and right vertical pipe portions 13, 13 of the upper frame 10 which constitute an upper portion of the side frame 20.

The cross member 15 is configured such that its central portion is located in a position substantially as high as the two end portions fixed to the front sides of the left and right vertical pipe portions 13, 13 by welding, and in each of the sections at both sides of the central portion, two bent portions 16, 17 bowed downward to deviate from the position of its axial line (laterally extending line connecting the two ends of the cross member 15) are formed, respectively, in a bilaterally symmetrical position.

Outer bent portions 16, 16 closer to the vertical pipe portions 13, 13, each bent in the form of a letter V with a rounded corner, have at least lower ends thereof located laterally outside the pressure-receiving member 40 above the pressure-receiving member 40. On the other hand, inner bent portions 17, 17, each bent in the form of a letter U with rounded corners, are located in their entireties (including lower ends thereof) above the pressure-receiving member 40.

The left and right bent portions 16, 17 are disposed slightly rearwardly relative to the pressure-receiving member 40 in positions facing the back sides of the shoulder regions of the occupant, and also serve to retain the shape of the rear side of the seat back pad which will be described later.

These bent portions 16, 17 have rigidities such that rearward motion of the shoulder regions can be limited properly when the upper body of the occupant subsides into the seat back S2, and if a great rearward motion load is received from the shoulders of the occupant, the bent portions are caused to pivot about the axial line of the cross member 15 and undergo plastic deformation, so that the shock given to the shoulder regions of the occupant can be absorbed.

Figure 5:
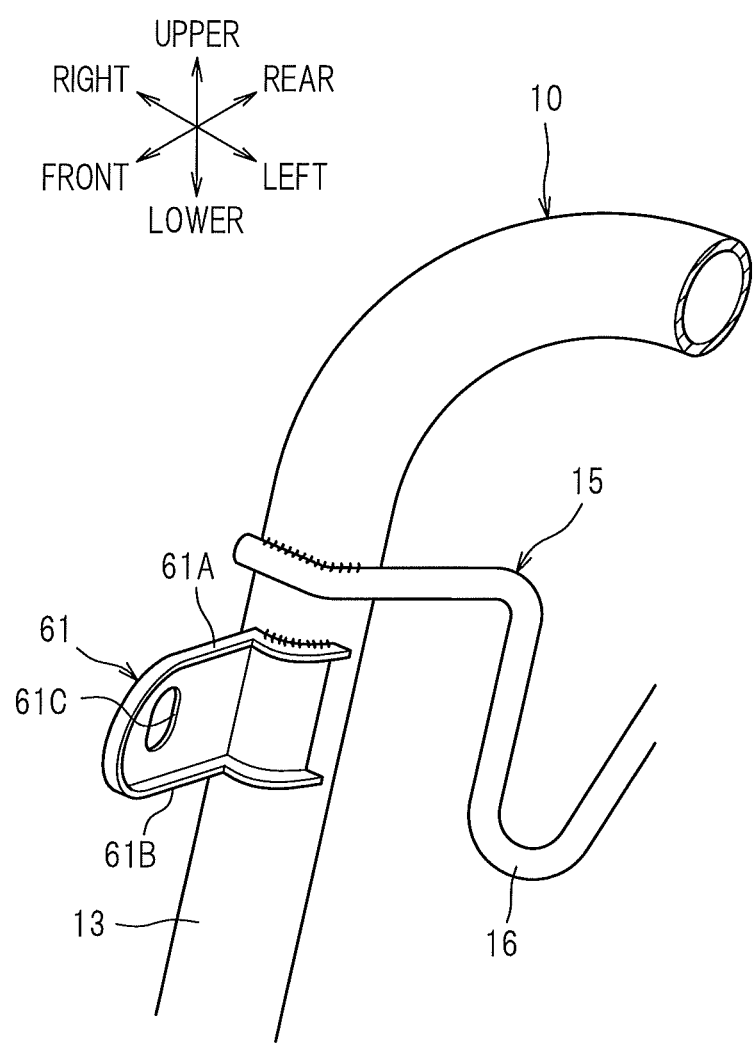
FIG. 5 is a perspective view of a mount bracket shown in FIG. 2 and its vicinity.

Herein, as shown in FIG. 5 and FIG. 6, a right end portion of the cross member 15 is fixed by welding to a front side of the right vertical pipe portion 13 of the upper frame 10, and in a position directly below it, a mount bracket 61 for the side air bag device 60 as one example of an attachment is fixed thereto by welding. To be more specific, the mount bracket 61 is welded to an area at a laterally inner side (i.e., left side) of an outer peripheral surface of the vertical pipe portion 13.

The mount bracket 61, which is made of sheet metal, protrudes from the front side of the vertical pipe portion 13 frontward along a direction in which the side frame main body portion 21 juts out. The mount bracket 61 is provided with flanges 61A, 61B protruding therefrom inward at upper and lower edges thereof, respectively, to thereby have a U-shaped cross section, thus possessing a great rigidity. The mount bracket 61 has a slot 61C formed therein, and the direction of the length of the slot 61C is parallel to the direction of the length of the vertical pipe portion 13. To the slot 61C of the mount bracket 61, an upper end portion of the side air bag device 60 disposed to extend along the right side surface of the side frame main body portion 21 and the vertical pipe portion 13 is fixed through a bolt-nut arrangement BN applied from a laterally outer side.

As described above, a portion at which the mount bracket 61 is fixed to the vertical pipe portion 13 is located at a laterally inner side of the vertical pipe portion 13, and thus the portion at which the mount bracket 61 is fixed to the vertical pipe portion 13 is not exposed to the outside; therefore, the side air bag device 60 can be attached thereto from outside with increased ease. Furthermore, since the side air bag device 60 is disposed along the vertical pipe portion 13 of the side frame 20 and the slot 61C is disposed to extend in parallel to the vertical pipe portion 13, the side air bag device 60 is prevented from being misaligned in the front-rear direction even when a positioning error is introduced for the attachment. Accordingly, the side air bag device 60 can be arranged with the side frame 20 in such a manner as to achieve compactness, and the workability in attachment is improved due to allowance of the positioning error to be introduced for the attachment.

The side air bag device 60 includes webbing mounting hardware 62 for attaching webbing for restricting a direction of development of the air bag (not shown), to the side frame 20. This webbing mounting hardware 62 is made of a rod bent in the shape of a vertically elongated letter U, and arranged to protrude to the pressure-receiving member 40 side, wherein an upper end portion thereof is fixed by welding to a position of the vertical pipe portion 13 adjacent to a portion to which the support tab 14 is fixed, and a lower end portion thereof is fixed to the side frame main body portion 21.

The right extra-length portion 24 of the upper connecting wire 22 described above is bowed upward (toward a direction away from the webbing mounting hardware 62) so as not to interfere with the webbing mounting hardware 62, and a right end portion of this upper connecting wire 22 is connected to a high-rigidity portion of the vertical pipe portion 13, that is, a position adjacent to a spot at which the webbing mounting hardware 62 is welded thereto, whereby the strength of connection of the upper connecting wire 22 is enhanced.

Figure 7:
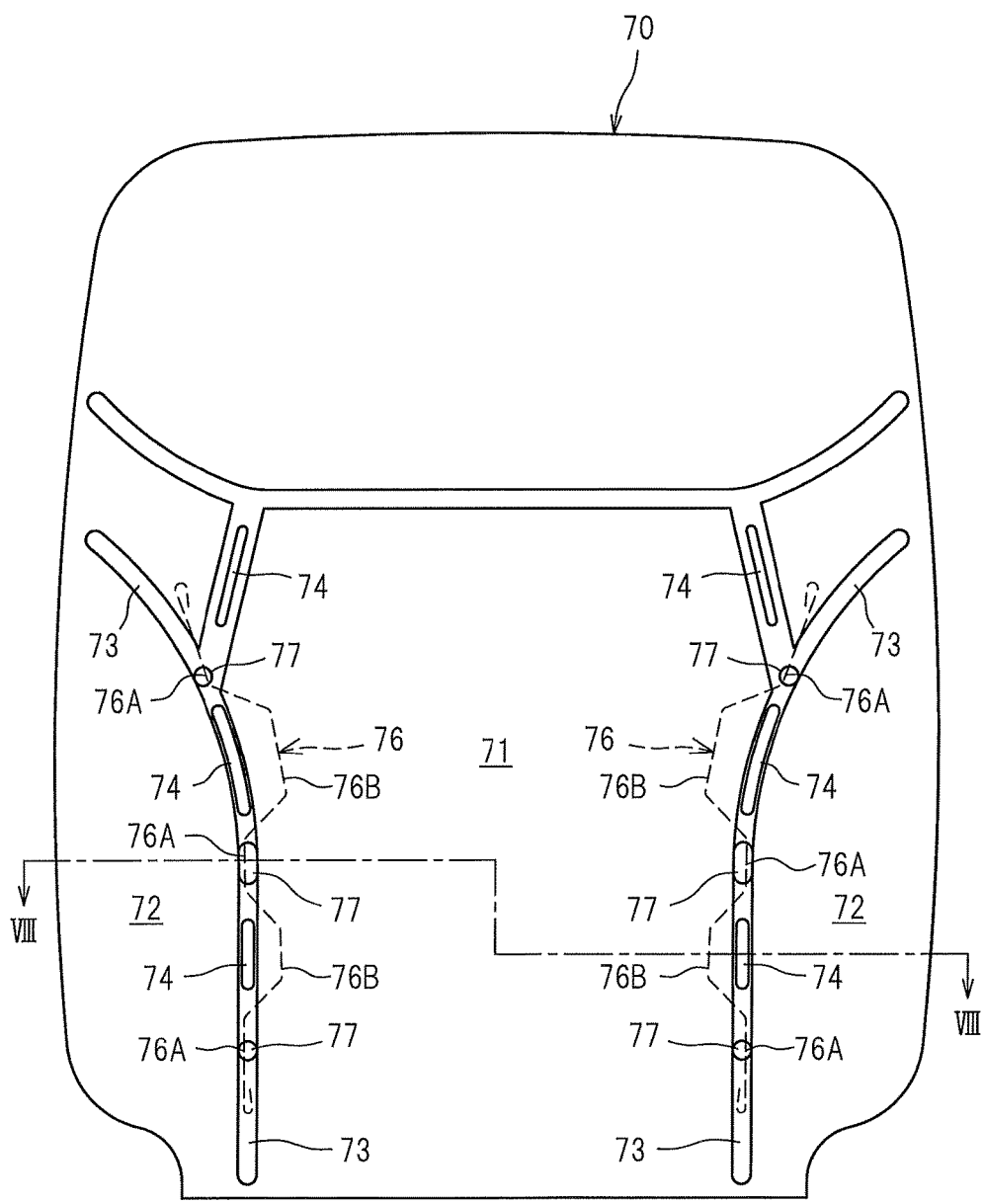
FIG. 7 is a front elevation of a seat back pad incorporated in the seat back shown in FIG. 1.
Figure 8:
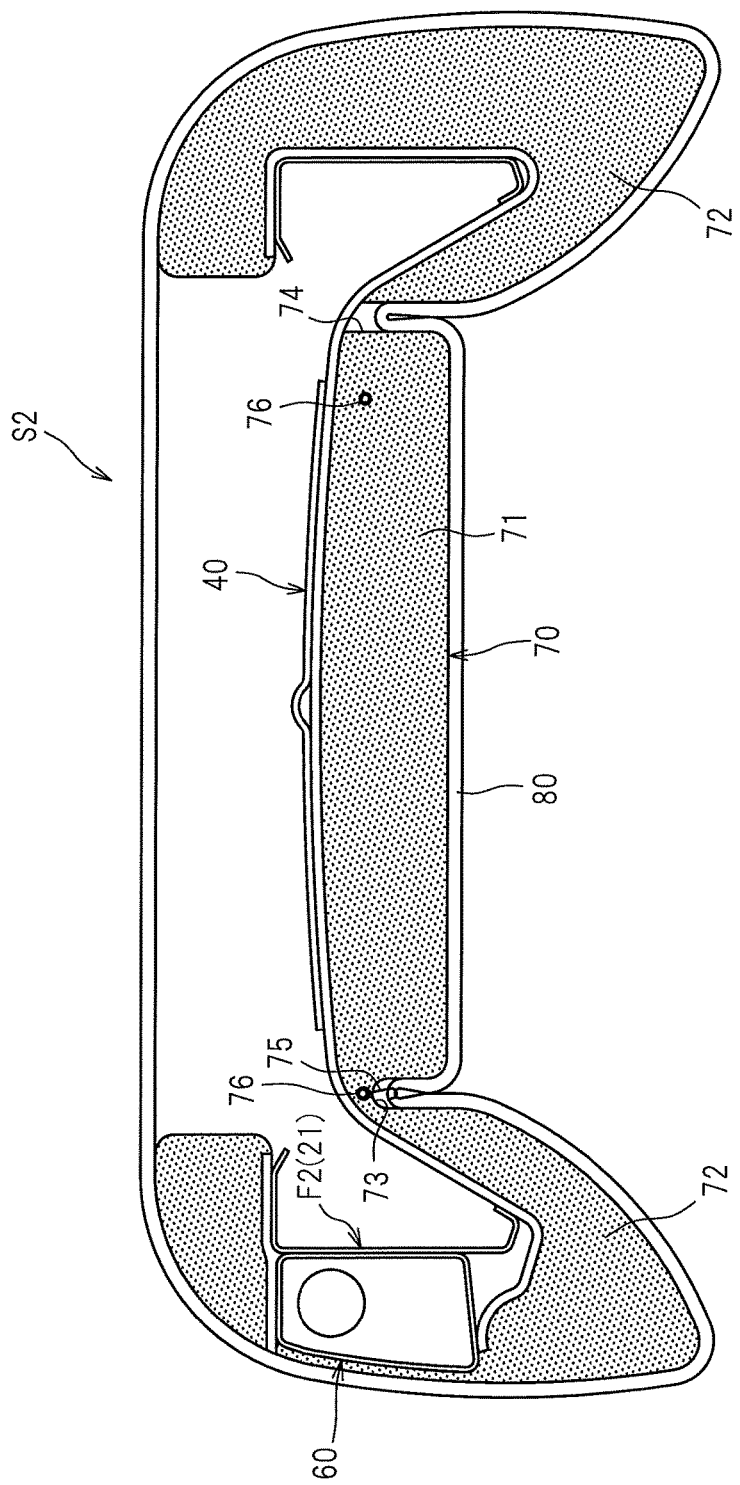
FIG. 8 is a sectional view taken along line VIII-VIII of FIG. 7.

As shown in FIG. 7 and FIG. 8, the seat back S2 is provided with a seat back pad 70 made of a cushion material such as urethane foam covered with a skin material 80 made of synthetic leather, fabric, or the like. This seat back pad 70 covers at least a front side of the pressure-receiving member 40 and the seat back frame F2 which constitute a frame of the seat back S2.

The seat back pad 70 has a configuration in which a central portion 71 facing a back of an upper portion of an occupant, and left and right side portions 72, 72 jutting out from the left and right sides of the central portion 71 in an obliquely frontward and outward direction are continuously provided, and grooves 73 for tucking the skin material 80 therein are formed at borders between the central portion 71 and the left and right side portions 72, 72. In order to allow the central portion 71 of the seat back pad 70 to easily move rearward together with the pressure-receiving member 40, relative to the left and right side portions 72, 72 of the seat back pad 70, the bottoms of the grooves 73 have a plurality of slot holes 74 as an example of holes pierced therethrough and arranged along the grooves 73 (see FIG. 7, in particular).

In the seat back pad 70 as described above, tuck-in wires 76 for tucking the skin material 80 in by means of hook members 75 are embedded by an insert molding process. The tuck-in wires 76 include a plurality of tuck-in portions 76A provided along the grooves 73, and bent detour portions 76B as an example of connecting portions which detour around the respective slot holes 74 and connecting the plurality of tuck-in portions 76A. The tuck-in portions 76A are embedded in the seat back pad 70 in a bent state such that the tuck-in portions 76A are partially exposed (or slightly embedded) through a plurality of windows 77 provided in the bottoms of the grooves 73. Supposing that the tuck-in wires 76 were configured to detour around the slot holes 74 to a laterally outer side (side portion 72 side), they should be bent three-dimensionally (not in a plane) so as to be routed along the frontwardly jutting shape of the side portion 72, but they are herein configured to detour to the central portion 71 side, and can thus be configured to be bent in a plane, so that the productivity can be improved. As shown in FIG. 8, the tuck-in wires 76 have a portion overlapping the pressure-receiving member 40 as viewed from a front-rear direction. Therefore, when a load is applied to the tuck-in wires from the front, the pressure-receiving member receives this load, so that unevenly balanced imposition of the load on the tuck-in wires can be suppressed.

Herein, in order to make it possible to effectively transmit a rearward motion load generated when the upper body of an occupant moves rearward, from the central portion 71 of the seat back pad 70 to the whole pressure-receiving member 40, the grooves 73 and the slot holes 74 are disposed in positions outside relative to the pressure-receiving member 40 and inside relative to the left or right side frame 20 with respect to the lateral direction. In order to make it possible to transmit the rearward motion load from the central portion 71 of the seat back pad 70 to the extra-length portions 24 of the upper connecting wire 22, a pair of left and right slot holes 74 disposed in the highest positions among the plurality of slot holes 74 are arranged in positions facing the extra-length portions 24 of the upper connecting wire 22 (see FIG. 3).

The webbing mounting hardware 62 is disposed rearwardly of the side portions 72.

Figure 9:
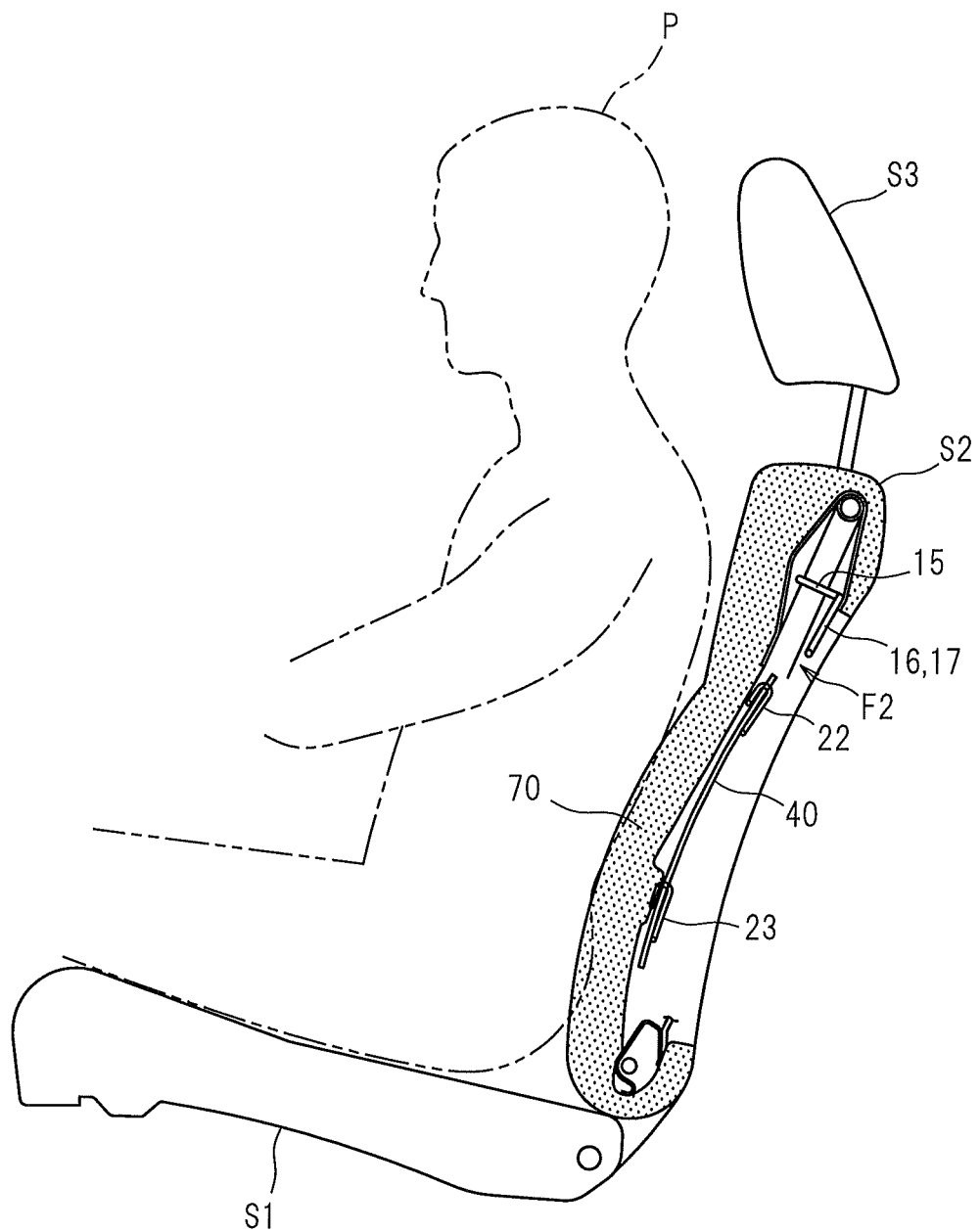
FIG. 9 is a sectional view of a seat back illustrated with an in-seat posture of an occupant during a normal driving operation of the car.

Next, referring to a car seat S configured as one embodiment of a vehicle seat according to the present invention, its operation and advantageous effects will be described. During a normal driving operation of a relevant car in which the car seat S shown in FIG. 1 is installed as a driver's seat, in many cases, an occupant P seated on the seat cushion S1 is usually postured in an in-seat position with his/her head slightly separate frontward from the headrest S3, as shown in FIG. 9.

Figure 10:
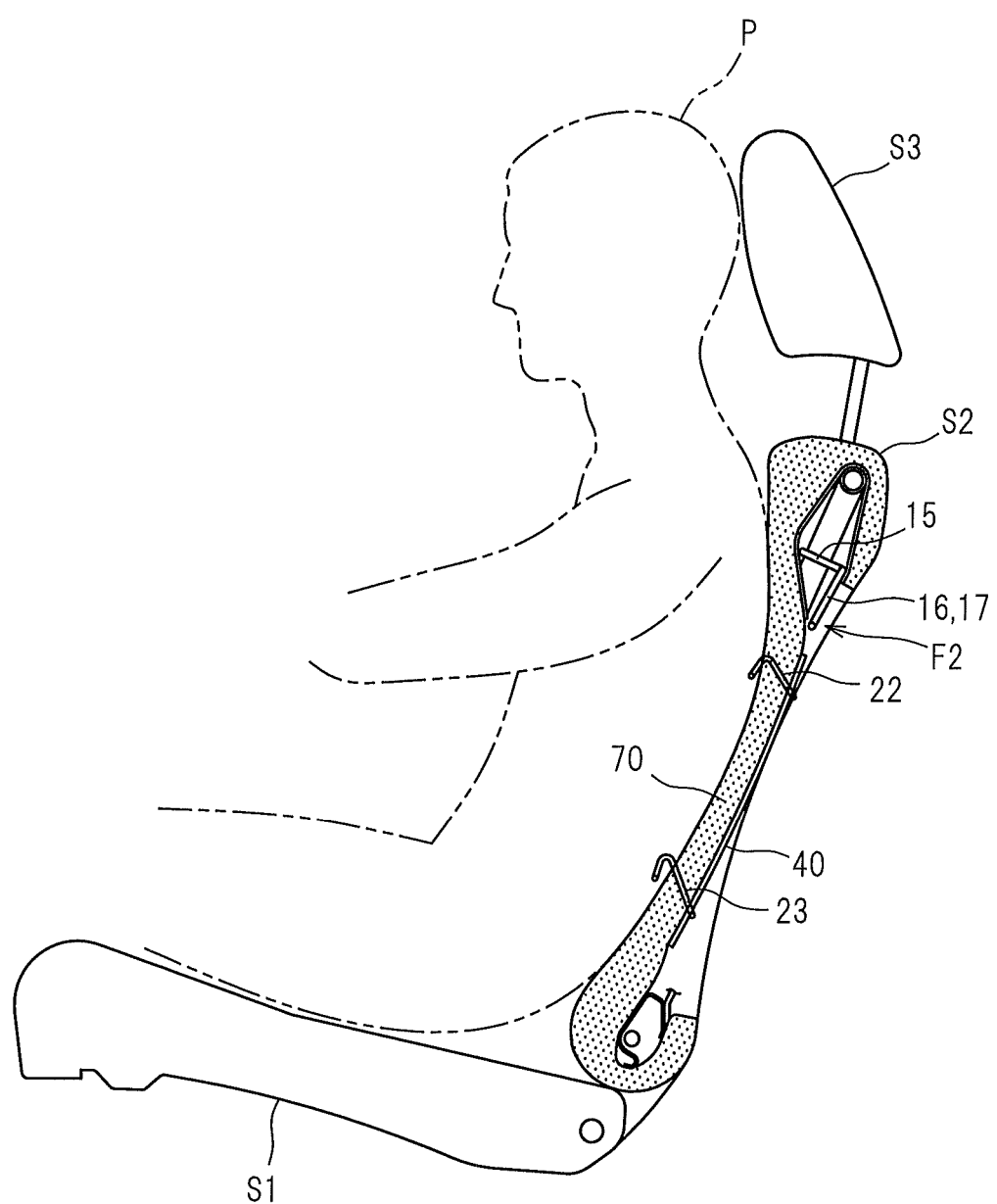
FIG. 10 is a sectional view of the seat back illustrated with an in-seat posture of an occupant in a moderate rear-end collision or at an early stage in a rear-end collision.

When the relevant car with the occupant P having such an in-seat posture is rear-ended by another car or the rear end of the relevant car being reversed strikes another car or a construct, a rearward motion load of a predetermined magnitude or greater received from the upper body of the occupant P and acting on the seat back S2 causes the pressure-receiving member 40 to move rearward together with the seat back pad 70 relative to the seat back frame F2. Accordingly, the upper body of the occupant P subsides into the seat back S2 as shown in FIG. 10. During this time, the upper body of the occupant P becomes curved with his/her back being hunched, after the shoulder regions of the occupant P subside slightly into the seat back S2, because the bent portions 16, 17 of the cross member 15 are disposed slightly rearwardly relative to the pressure-receiving member 40; thus, the head of the occupant can be swiftly brought close to the headrest S3, and received by the headrest S3.

Figure 11:
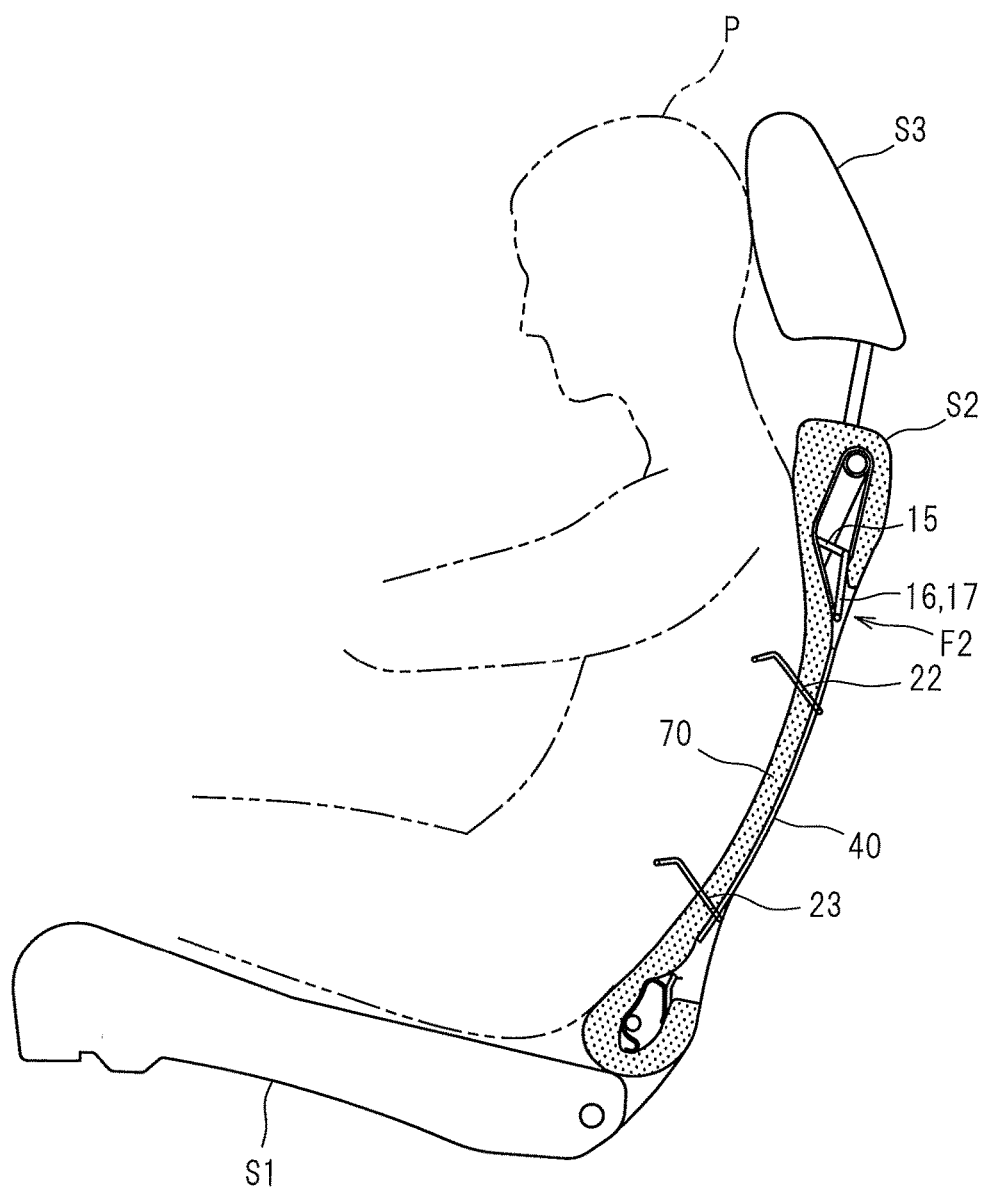
FIG. 11 is a sectional view of the seat back illustrated with an in-seat posture of an occupant in an intense rear-end collision.

Furthermore, when the upper body of the occupant P subsides deeply into the seat back S2 according to the rear-end collision load, the left and right bent portions 16, 17 of the cross member 15 and the left and right upwardly bowed extra-length portions 24, 24 of the upper connecting wire 22 operate together in harmony so as to receive and suppress the rearwardly moving shoulder regions of the occupant P. Therefore, in an intense rear-end collision, as shown in FIG. 11, the upper body of the occupant P subsides into the seat back S2 while keeping his/her safe in-seat posture with his/her back being hunched. In case that the rearward motion load received from the shoulder regions of the occupant P by the left and right bent portions 16, 17 is extraordinary great, the bent portions 16, 17 are caused to pivot about the axial line of the cross member 15 and undergo plastic deformation, so that the shock given to the shoulder regions of the occupant P can be absorbed.

When the upper body of the occupant P subsides into the seat back S2, the left and right extra-length portions 24, 24 of the upper connecting wire 22 warp rearward while acting as a torsion spring, and extend greatly; therefore, the rearward motion stroke of the pressure-receiving member increases, and the upper body of the occupant P subsides more deeply into the seat back S2. Herein, the upper connecting wire 22 is arranged in such a manner that the right end portion thereof is connected to a position adjacent to a high-rigidity portion of the right vertical pipe portion 13 of the upper frame 10, that is, a portion to which the webbing mounting hardware 62 of the side air bag device 60 is fixed by welding. Therefore, the upper connecting wire 22 can effectively receive the rearward motion load on the pressure-receiving member 40. Since the extra-length portions 24, 24 are disposed in positions facing the slot holes 74, a region in which the upper connecting wire 22 deforms when the pressure-receiving member 40 moves rearward and a region in which the seat back pad 70 deforms at the same time coincide substantially with each other, and thus the seat back pad 70 and the extra-length portion 24 are easily deformable, so that the rearward motion of the pressure-receiving member 40 is rendered smooth.

Furthermore, when the upper body of the occupant P subsides into the seat back S2, the side frame main body portions 21 which constitute pad shape retainer portions and the mount bracket 61 for the side air bag device 60 fixed to the vertical pipe portion 13 which mount bracket is provided above the side frame main body portion 21 are configured to operate in harmony so as to constrain the upper and lower portions of the both side portions of the seat back pad 70 to some extent, thus suppressing the rearward deformation of these portions; therefore, the seat back pad 70 is easy to deform so that its midsection in the height direction thereof deforms rearward without undue strain. Accordingly, it becomes likely that the rearward motion load is transmitted from the central portion 71 of the seat back pad 70 to the pressure-receiving member 40 entirely without fail, so that the upper body of the occupant P subsides into the seat back S2 sufficiently, and the clearance between the occupant P and the headrest S3 swiftly decreases.

In addition, when the upper body of the occupant P subsides into the seat back S2, the central portion 71 of the seat back pad 70 which faces the back of the upper body of the occupant P moves rearward easily and sufficiently relative to the left and right side portions 72, 72 of the seat back pad 70, which are defined therefrom by the borders at the grooves 73 in which a plurality of the slot holes 74 are formed. Accordingly, it becomes likely that the rearward motion load is transmitted from the central portion 71 of the seat back pad 70 to the pressure-receiving member 40 entirely without fail, so that the upper body of the occupant P subsides into the seat back S2 sufficiently. However, since the webbing mounting hardware 62 is disposed rearwardly of the side portion 72, excessive rearward deformation of the side portion 76 is suppressed.

Consequently, according to one embodiment of the car seat S, the tilting-back of the head of the occupant P can be suppressed sufficiently and effectively, moreover, the head of the occupant P can be received by the headrest S3 sufficiently and effectively, and the shock to be given to the neck of the occupant can be reduced sufficiently and effectively. Furthermore, since the rearward motion load given from the shoulder regions of the occupant P and acting on the seat back S2 is received by the left and right bent portions 16, 17 of the cross member 15 in a well-balanced fashion, the occupant P can be kept in a stabilized in-seat posture.

Since the tuck-in wire 76 detours around the slot holes 74, the tuck-in wire 76 is not exposed through the slot holes 74, so that exposed portions of the tuck-in wire 76 is reduced and thus adhesion between tuck-in wire 76 and the seat back pad 70 is improved, and damage of the seat back pad 70 at the edges of the seat back pad 70 adjoining the tuck-in wire 76 is suppressed.

Since the extra-length portions 24 are bowed toward directions away from the webbing mounting hardware 62, interference of the extra-length portions 24 with the webbing mounting hardware 62 is prevented, and thus the workability in attachment of the upper connecting wire 22 is improved.

Although a description has been given of a car seat S as one embodiment of a vehicle seat according to the present invention, the vehicle seat according to the present invention is not limited to the one embodiment of the car seat S, and the configurations may be modified where appropriate. For example, a car seat of a bucket type may be applicable which includes no reclining mechanism RL and comprises a seat cushion S1, a seat back S2 and a headrest S3 that are integrally constructed together.

The vehicle seat according to the present invention may be configured as a seat for a ship or for an aircraft.

The number of the bent portions 16, 17 may not be limited to the total four as in an illustrated embodiment in which the bent portions are bilaterally symmetrically arranged, but may be two or three.

The extra-length portion 24 in one embodiment is illustrated to have an upwardly bowed U-shape (like an inverted U), but may alternatively have a frontwardly or rearwardly bowed shape or a downwardly bowed shape. The two end portions of the connecting wire 22 which are connected to the side frames 20 may be disposed in a position lower than the middle portion supporting the pressure-receiving member 40.

The tuck-in wire 76 in one embodiment is configured to detour around the slot holes 74 toward a laterally center side, but may be configured to detour toward a laterally outer side.

In the above-described embodiment, the side air bag device 60 is illustrated as an example of an attachment, but a motor or a sensor may be adopted as an attachment.

The invention claimed is:

1. A vehicle seat, comprising:
   a seat cushion; and
   a seat back comprising:
      a frame member comprising an upper frame constituting an upper part of the frame member, left and right side frames connected respectively to left and right ends of the upper frame and extending downward, and a lower frame connecting lower portions of the left and right side frames;
      a pressure-receiving member provided inside the frame member in a position corresponding to a back of an upper body of an occupant to support the occupant;
      a connecting member connecting the pressure-receiving member to the frame member;
      a pad member including a central portion and left and right side portions provided continuously to left and right sides of the central portion, respectively, the pad member having a groove formed at borders between the central portion and the respective side portions, the groove having a bottom in which a first through hole is provided; and
      a skin material with which the pad member is covered,
   wherein the pad member incorporates a tuck-in member which is disposed under a first section of the groove and configured to allow the skin material to be hooked thereon whereby the skin material is tucked in the groove, the first through hole being disposed in the bottom of a second section of the groove under which the tuck-in member is not disposed,
   the first through hole and the pressure-receiving member are located to intersect a same horizontal plane,
   the pressure-receiving member has a recessed portion formed on a peripheral edge of the pressure-receiving member, the recessed portion being recessed laterally inwardly relative to other portions of the peripheral edge of the pressure-receiving member, and
   the first through hole of the pad member and the recessed portion of the pressure-receiving member are located to intersect the same horizontal plane.

2. The vehicle seat according to claim 1, wherein the recessed portion includes a pair of recessed portions provided respectively at left and right sides of the pressure-receiving member,
   wherein the pressure-receiving member has a second through hole provided between the pair of recessed portions, and
   wherein the first through hole and the second through hole are located to intersect a same horizontal plane.

3. The vehicle seat according to claim 2, wherein the first through hole, the second through hole, and the connecting member are located to intersect the same horizontal plane.

4. The vehicle seat according to claim 1, further comprising an upper connecting part and a lower connecting part at which the connecting member is connected to the frame member, wherein the first through hole is provided in a position lower than a position of the upper connecting part and higher than a position of the lower connecting part.

5. The vehicle seat according to claim 4, wherein the upper connecting part, the lower connecting part, and the through hole are located to intersect a same vertical plane.

6. The vehicle seat according to claim 5, wherein the first through hole includes a plurality of through holes provided along the groove, and the plurality of through holes, the upper connecting part, and the lower connecting part are located to intersect the same vertical plane.

7. The vehicle seat according to claim 1, wherein a portion of the connecting member between the frame member and the pressure-receiving member is bent to include a downwardly extending portion, and
   wherein the downwardly extending portion of the connecting member is located in a position closer to a center of the vehicle seat in a lateral direction than the first through hole.

8. The vehicle seat according to claim 7, wherein the downwardly extending portion of the connecting member is located laterally adjacent to the pressure-receiving member.

9. The vehicle seat according to claim 7, wherein an upper end of the downwardly extending portion of the connecting member is located in a position higher than a position of an upper end of the recessed portion of the pressure-receiving member.

10. The vehicle seat according to claim 1, wherein the pad member further has a lateral groove extending in a lateral direction of the vehicle seat,
    wherein the groove includes a left groove and a right groove each extending in an upward-downward direction, the lateral groove being connected to the left groove and to the right groove, and
    wherein the first through hole is provided in a position lower than a position in which the lateral groove is provided.

11. The vehicle seat according to claim 10, wherein the lateral groove is located so as not to overlap the pressure-receiving member as viewed from a front side of the vehicle seat.

12. The vehicle seat according to claim 1, wherein the pressure-receiving member includes a rearwardly protruding portion provided in a laterally central position of the pressure-receiving member.

13. The vehicle seat according to claim 1, wherein the connecting member and the first through hole are located to intersect the same horizontal plane.

14. A vehicle seat, comprising:
a seat cushion; and
a seat back comprising:
- a frame member comprising an upper frame constituting an upper part of the frame member, left and right side frames connected respectively to left and right ends of the upper frame and extending downward, and a lower frame connecting lower portions of the left and right side frames;
- a pressure-receiving member provided inside the frame member in a position corresponding to a back of an upper body of an occupant to support the occupant, the pressure-receiving member having a recessed portion formed on a peripheral edge of the pressure-receiving member, the recessed portion being recessed laterally inwardly relative to other portions of the peripheral edge of the pressure-receiving member;
- a connecting member connecting the pressure-receiving member to the frame member;
- a pad member including a central portion and left and right side portions provided continuously to left and right sides of the central portion, respectively, the pad member having a groove formed at borders between the central portion and the respective side portions, the groove having a bottom in which a first through hole is provided; and
- a skin material with which the pad member is covered,
- wherein the pad member incorporates a tuck-in member which is disposed under a first section of the groove and configured to allow the skin material to be hooked thereon whereby the skin material is tucked in the groove, the first through hole being disposed in the bottom of a second section of the groove under which the tuck-in member is not disposed,
- the connecting member and the first through hole are located to intersect a same horizontal plane, and
- the first through hole and a side air bag device attached to the left or right side frame are located to intersect a same horizontal plane.

15. The vehicle seat according to claim 14, wherein the first through hole is located in a position lower than a position in which the air bag device is attached.

16. A vehicle seat, comprising:
a seat cushion; and
a seat back comprising:
- a frame member comprising an upper frame constituting an upper part of the frame member, left and right side frames connected respectively to left and right ends of the upper frame and extending downward, and a lower frame connecting lower portions of the left and right side frames;
- a pressure-receiving member provided inside the frame member in a position corresponding to a back of an upper body of an occupant to support the occupant, the pressure-receiving member having a recessed portion formed on a peripheral edge of the pressure-receiving member, the recessed portion being recessed laterally inwardly relative to other portions of the peripheral edge of the pressure-receiving member;
- a connecting member connecting the pressure-receiving member to the frame member;
- a pad member including a central portion and left and right side portions provided continuously to left and right sides of the central portion, respectively, the pad member having a groove formed at borders between the central portion and the respective side portions, the groove having a bottom in which a first through hole is provided,
- a skin material with which the pad member is covered,
- wherein the pad member incorporates a tuck-in member which is disposed under a first section of the groove and configured to allow the skin material to be hooked thereon whereby the skin material is tucked in the groove, the first through hole being disposed in the bottom of a second section of the groove under which the tuck-in member is not disposed, and
- the first through hole is located between the pressure-receiving member and the left or right side frame.

17. The vehicle seat according to claim 16, wherein the connecting member is located so as not to overlap the first through hole as viewed from a front side of the vehicle seat.

* * * * *